US011262844B2

(12) United States Patent
Li (10) Patent No.: US 11,262,844 B2
(45) Date of Patent: Mar. 1, 2022

(54) REHABILITATION ROBOT, REHABILITATION SYSTEM, REHABILITATION METHOD AND REHABILITATION DEVICE (71) Applicant: BOE TECHNOLOGY GROUP CO., LTD., Beijing (CN)

(72) Inventor: Yingyi Li, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 223 days.

(21) Appl. No.: 16/090,707

(22) PCT Filed: Mar. 5, 2018

(86) PCT No.: PCT/CN2018/077961
§ 371 (c)(1),
(2) Date: Oct. 2, 2018

(87) PCT Pub. No.: WO2018/205722
PCT Pub. Date: Nov. 15, 2018

(65) Prior Publication Data
US 2019/0384391 A1 Dec. 19, 2019

(30) Foreign Application Priority Data
May 9, 2017 (CN) .......................... 201710322996.1

(51) Int. Cl.
*G06F 3/01* (2006.01)
*A63B 21/00* (2006.01)
(Continued)

(52) U.S. Cl.
CPC .............. *G06F 3/015* (2013.01); *A61H 1/00* (2013.01); *A63B 21/4045* (2015.10);
(Continued)

(58) Field of Classification Search
CPC ..... G06F 3/015; G06F 3/011; A63B 21/4045; A61H 1/00; A61H 1/0237; A61H 1/0262;
(Continued)

(56) References Cited

U.S. PATENT DOCUMENTS 5,624,383 A * 4/1997 Hazard ................ A61H 1/0292
601/5
2003/0028130 A1* 2/2003 Wunderly ........ A63B 21/00181
601/5
(Continued)

FOREIGN PATENT DOCUMENTS

CN 101474120 A 7/2009
CN 101978940 A 2/2011
(Continued)

OTHER PUBLICATIONS

International Search Report and Written Opinion dated May 30, 2018 from State Intellectual Property Office of the P.R. China.

*Primary Examiner* — Justine R Yu
*Assistant Examiner* — Kelsey E Baller
(74) *Attorney, Agent, or Firm* — Dilworth & Barrese, LLP.; Michael J. Musella, Esq.

(57) ABSTRACT

A rehabilitation system includes: a rehabilitation robot configured to execute corresponding actions according to motion instructions; a brain wave detector configured to detect brain wave signals of a user; and control device configured to generate motion instructions according to brain wave signals to control the rehabilitation robot to execute corresponding actions.

12 Claims, 7 Drawing Sheets (51) Int. Cl.
*A61H 1/00* (2006.01)
*G06K 9/00* (2006.01)
*G06T 19/00* (2011.01)

(52) U.S. Cl.
CPC ........ *G06K 9/00671* (2013.01); *G06T 19/006* (2013.01); *A61H 2201/5041* (2013.01); *A61H 2230/105* (2013.01)

(58) Field of Classification Search
CPC ...... A61H 2230/105; A61H 2201/5061; A61H 2201/5064; A61H 2201/5097; A61H 2201/5041; G06K 9/00671; G06K 9/00496; G06T 19/006
USPC .................................................. 601/5, 23–33
See application file for complete search history.

(56) References Cited

U.S. PATENT DOCUMENTS

| | | | | |
|---|---|---|---|---|
| 2006/0079817 | A1* | 4/2006 | Dewald | A61H 1/02 601/5 |
| 2006/0293617 | A1* | 12/2006 | Einav | G06F 3/016 601/33 |
| 2009/0221928 | A1* | 9/2009 | Einav | A61B 5/11 600/544 |
| 2009/0259338 | A1* | 10/2009 | Tong | A63B 23/0355 700/258 |
| 2011/0238685 | A1* | 9/2011 | Garcia Molina | A61B 5/0476 707/769 |
| 2011/0295165 | A1* | 12/2011 | Cavallaro | A63B 22/20 601/33 |
| 2012/0143104 | A1* | 6/2012 | Tee | A61H 1/02 601/23 |
| 2013/0060171 | A1* | 3/2013 | Fu | A61H 1/02 601/5 |
| 2013/0237883 | A1* | 9/2013 | Malosio | A61H 1/0274 601/33 |
| 2016/0000633 | A1* | 1/2016 | An | A61H 1/0277 601/33 |
| 2018/0345833 | A1* | 12/2018 | Gallagher | A61B 5/1114 |

FOREIGN PATENT DOCUMENTS

| | | |
|---|---|---|
| CN | 201743876 U | 2/2011 |
| CN | 102306029 A | 1/2012 |
| CN | 102813998 A | 12/2012 |
| CN | 104606030 A | 5/2015 |
| CN | 104706495 A | 6/2015 |
| CN | 106109164 A | 11/2016 |
| CN | 106361539 A | 2/2017 |
| CN | 107157705 A | 9/2017 |
| JP | 08280762 A | 10/1996 |

\* cited by examiner

REHABILITATION ROBOT, REHABILITATION SYSTEM, REHABILITATION METHOD AND REHABILITATION DEVICE

TECHNICAL FIELD

Embodiments of the present disclosure relate to a rehabilitation robot, a rehabilitation system, a rehabilitation method, a rehabilitation device and a nonvolatile storage medium.

BACKGROUND

With the development of science and technology, rehabilitation robots have been applied more and more widely in rehabilitation care, artificial limbs and rehabilitation healing. For example, research on rehabilitation robots is mainly focused on several aspects: rehabilitation robotic arms, hospital robot systems, intelligent wheelchairs, artificial limbs and rehabilitation healing robots.

At present, brain-wave-related technologies are mostly applied in medical fields such as treating patients with brain diseases such as seizure. However, most research remain in the lab stage, which on the one hand is due to the two complex human brain and the initial research on it, and on the other hand is due to the difficulty of measuring brain waves that is an important reason of inhibiting further development of technology.

Generally, in the case that the nerve center is damaged, a problem of losing motion capability might occur. In general, it is possible to help a patient to restore motion capability by one to one motion rehabilitation between a doctor and the patient. However, a special doctor assistance is needed for motion rehabilitation which might consume efforts and time. And there is a high requirement for experience of the assistant doctor in motion rehabilitation. Further, there might lack active patient participation in existing motion rehabilitation scheme.

SUMMARY

According to at least one embodiment of this disclosure, a rehabilitation robot is provided, which comprises: a base; a supporting assembly; a driving assembly for controlling motion of the supporting assembly, wherein the driving assembly comprising: a first cantilever connected with the base; a second cantilever connected with the first cantilever; and a motor for driving the first cantilever and the second cantilever.

For example, the rehabilitation robot further comprises: a position sensor located over the supporting assembly and configured to detect a horizontal position of the supporting assembly; and a torque sensor located between the first cantilever and the second cantilever and configured to detect a vertical position of the supporting assembly.

According to at least one embodiment of this disclosure, a rehabilitation system is provided, which comprises: the rehabilitation robot, the rehabilitation robot is configured to execute corresponding actions according to motion instructions; a brain wave detector configured to detect brain wave signals of a patient; and a control device configured to generate the motion instructions according to the brain wave signals to control the rehabilitation robot to execute corresponding actions.

For example, the control device controls the driving assembly of the rehabilitation robot according to the horizontal position and the vertical position.

For example, the control device comprises: a first feature extracting module configured to extract motion features in the brain wave signals; and a motion instruction generating module configured to generate the motion instructions according to the motion features.

For example, the control device further comprises: a second feature extracting module configured to extract discomfort features in the brain wave signals, wherein the motion instruction generating module decreases amplitude or frequency of the actions according to the discomfort features.

For example, the rehabilitation system further comprises: a motion image player configured to display motion images corresponding to the actions to the patient.

For example, the motion image player displays the motion images in a virtual reality mode.

According to at least one embodiment of this disclosure, a rehabilitation method is provided, which comprises: detecting brain wave signals of a patient; generating motion instructions according to the brain wave signals; and controlling a rehabilitation robot to execute corresponding actions according to the motion instructions.

For example, the rehabilitation method further comprises: displaying motion images corresponding to the actions to the patient.

For example, the step of controlling the rehabilitation robot to execute corresponding actions according to the motion instructions comprises: extracting motion features in the brain wave signals; and generating the motion instructions according to the motion features.

According to at least one embodiment of this disclosure, a rehabilitation device is provided, which comprises: a processor; and a memory for storing executable instructions; wherein the processor executes the rehabilitation method while effecting the instructions.

According to at least one embodiment of this disclosure, a nonvolatile computer readable storage medium is provided, the storage medium stores computer program instructions, after the instructions is loaded by a processor, the rehabilitation method is executed.

With the rehabilitation system and method according to embodiments of the present disclosure, it is possible to control motion rehabilitation by sending brain waves according to the patient's motion imagination, thereby stimulating the patient's active motion intention, improving the rehabilitation effect and drastically saving the consumption of efforts and time.

BRIEF DESCRIPTION OF THE DRAWINGS

The above-described and/or additional aspects and advantages of the present disclosure will become apparent and easy to understand in view of the following description of embodiments with respect to accompanying drawings, in which.

DETAILED DESCRIPTION

Embodiments of the present disclosure will be described in detail below. Examples of said embodiments are illustrated in the drawings throughout which same or similar numerals denote same or similar elements or elements with same or similar functions. The embodiments described below with reference to drawings are illustrative and meant to explain the present disclosure rather than limiting the present disclosure.

The rehabilitation system and method according to embodiments of the present disclosure will be described below with reference to drawings.

In the case that motion capability is lost due to the damaged brain nerve, the patient may not control limbs by autonomous nerve signals. However, nerves may restore motions by gradual rehabilitation motions.

Nevertheless, rehabilitation motions in related art are one to one assistance for restoring motion capability of a patient by a doctor. As can be seen, this consumes efforts and time, imposes high requirements on doctor's experience, and the patient is in a passive state lacking active participation, which ultimately influencing the rehabilitation effect.

Therefore, in order to realize motion rehabilitation control by brain wave signals emitted according to the patient's motion imagination, the present disclosure proposes a rehabilitation system. As compared to rehabilitation exercises in related art, no special personnel is needed for one to one assistance of rehabilitation exercise and the patient can actively participate in the rehabilitation exercise.

For example, the hardware involved in the present embodiment mainly includes a brain wave detector such as a brain wave electrode sensor, a signal amplifier, a control device such as a central data processing device or a microprocessor, a rehabilitation robot control board, a rehabilitation robot and a networked remote detection and control terminal, e.g. terminal devices such as a mobile phone or a tablet.

For example, the rehabilitation exercise in embodiments of the present invention includes for example, upper limb and lower limb exercises, but not limited to either or both of the upper limb rehabilitation exercise and the lower limb rehabilitation exercise. Other physical exercises may also be included.

Figure 1:
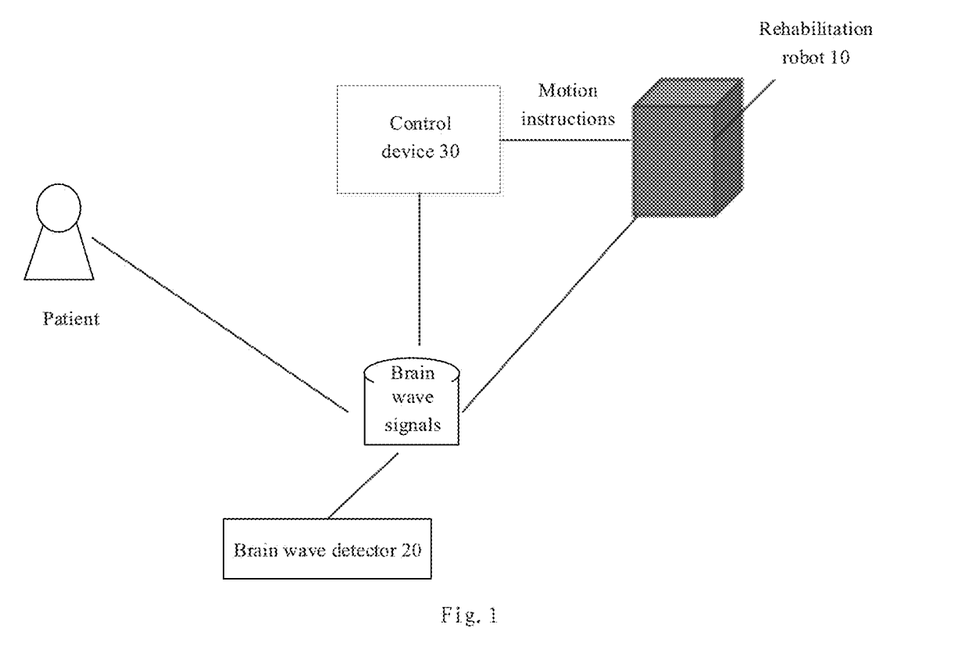
FIG. 1 is a structure diagram of a rehabilitation system provided in an embodiment of the present disclosure.

For example, FIG. 1 is a structure diagram of a rehabilitation system provided in an embodiment of the present disclosure. The rehabilitation system includes: a rehabilitation robot 10, a brain wave detector 20 and a control device 30.

The rehabilitation robot 10 is configured to execute corresponding actions according to motion instructions.

The brain wave detector 20 is configured to detect brain wave signals of the patient.

The control device 30 is configured to generate motion instructions according to brain wave signals to control the rehabilitation robot 10 to execute corresponding actions.

In practical applications, there are many kinds of brain wave signals. In the present embodiment, it is primary the brain wave signals generated by the patient's imagination of limb motion, namely motion imagination, that is used to stimulate active motion intention and improve rehabilitation exercise effect.

Figure 2:
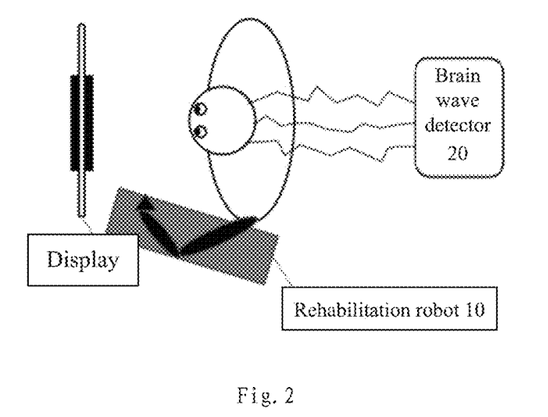
FIG. 2 is a structure diagram of acquiring brain wave signals provided in an embodiment of the present disclosure.

As an example, as shown in FIG. 2, the patient generates brain wave signals by viewing motion images on related display and imagining limb motions with the images such that the brain wave detector 20 may detect the brain wave signals of the patient, and the control device 30 generates motion instructions according to the brain wave signals to control the rehabilitation robot 10 to execute corresponding actions. Therefore, the problem in related art of lacking active patient participation and being in passive state is addressed and human brain control is achieved to improve restoring control of limbs over brain nerves. In addition, according to another example of the present disclosure, in the rehabilitation system, the display may also be connected with the control device such that the rehabilitation system may also output display signals to the control device while outputting display signals to the display. Alternatively, the rehabilitation system may also identify actions displayed in the images and convert them into instructions to be sent to the control device such that the control device may also control the rehabilitation robot 10 to execute corresponding actions based on the action instructions sent by the control system. In that manner, it is possible to avoid the case that the rehabilitation robot 10 can not be controlled when the brain wave detector 20 fails to detect the brain wave signals of the patient or detect wrongly.

In order to further improve the accuracy of control, it is necessary to process brain wave signals detected by the brain wave detector. It can be understood that different brain wave signals are acquired in the process of motion imagination by the patient and sent to the control device, and then the signals need to be subjected to processing such as amplification, filtering and quantification to generate motion instructions to control the rehabilitation robot 10 to execute corresponding actions, thereby implementing the motion state of virtual reality.

For example, the brain wave detector used in the present embodiment may be devices such as stent control which adopts frequency 0-50 kbps in detection with an adjustable range.

For example, a predetermined maximum amplitude needs to be set for the motion amplitude of the rehabilitation robot. It is further possible to include various actions such as up and down, left and right motions and bending. And mechanical structures should further be capable of stretching and shrinking to accommodate conditions of different patients.

Figure 3:
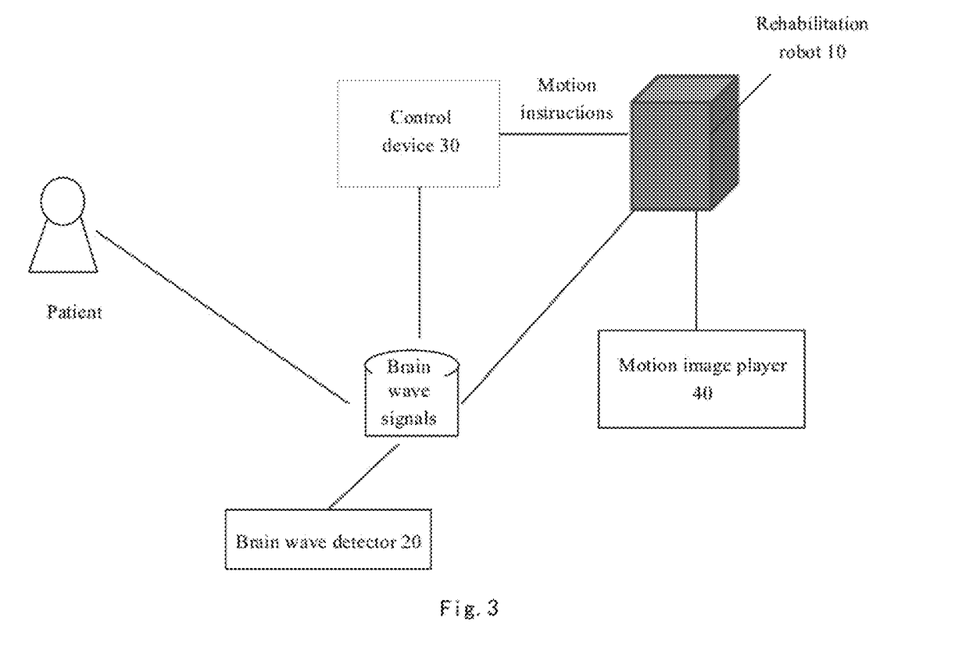
FIG. 3 is a structure diagram of another rehabilitation system provided in an embodiment of the present disclosure.

Further, FIG. 3 is a structure diagram of another rehabilitation system provided in an embodiment of the present disclosure. On the basis of FIG. 1, the rehabilitation system further includes a motion image player 40.

The motion image player is configured to play corresponding motion images for the patient. As an example, the motion image player 40 plays motion images in virtual reality manner. For example, the patient may wear a pair of glasses for virtual reality or augmented reality that output images to the patient to form visual feedback, which further improves interaction effects between the patient and the rehabilitation robot and thereby improving rehabilitation effects.

Based on the above description, the rehabilitation robot may assist the patient for rehabilitation exercise according to motion instructions, and the control device 30 and the rehabilitation robot 10 communicate with each other via wired or wireless connection such that the rehabilitation robot 10 can execute corresponding actions according to the motion instructions.

In order for those skilled in the art to understand how the rehabilitation robot assist a patient for rehabilitation exercise more clearly, description will be given below with respect to the specific structure of the rehabilitation robot.

Figure 4:
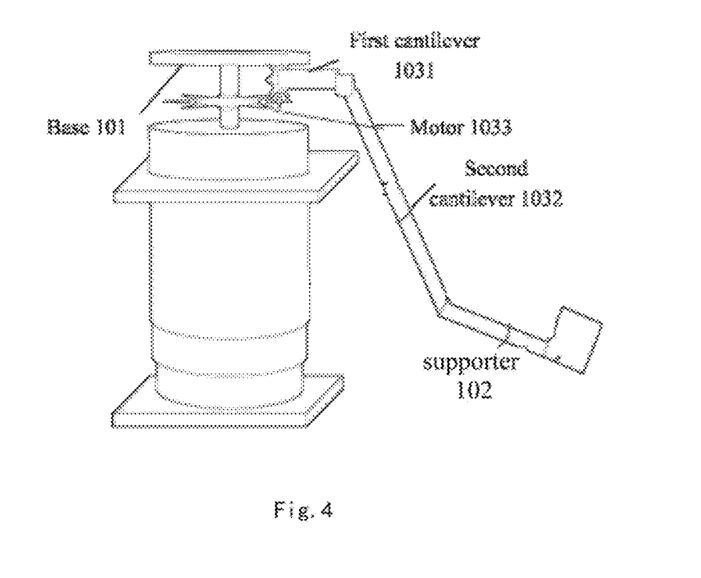
FIG. 4 is a structure diagram of a rehabilitation robot provided in an embodiment of the present disclosure.

FIG. 4 is a structure diagram of a rehabilitation robot provided in an embodiment of the present disclosure. As shown in FIG. 4, the rehabilitation robot 10 includes a base 101, a supporting assembly 102 and a driving assembly 103 for controlling motions of the supporting assembly 102.

Further, the driving assembly 103 includes a first cantilever 1031 connected with the base 101, a second cantilever 1032 connected with the first cantilever 1031, and a motor 1033 for driving the first cantilever 1031 and the second cantilever 1032.

Figure 5:
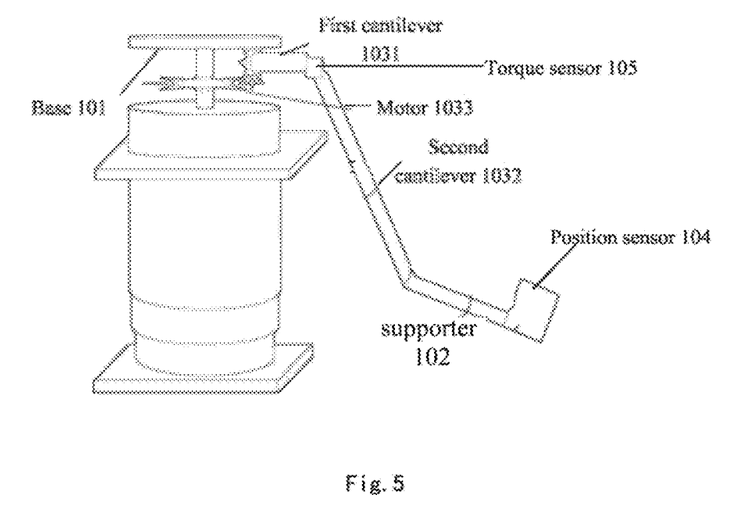
FIG. 5 is a structure diagram of another rehabilitation robot provided in an embodiment of the present disclosure.

Further, as shown in FIG. 5, the rehabilitation robot further includes a position sensor 104 located over the supporting assembly 102 for sensing the horizontal position of the supporting assembly, and a torque sensor 105 between the first cantilever 1031 and the second cantilever 1032 for sensing vertical position of the supporting assembly 102, in which the control device 30 controls the driving assembly 103 according to the horizontal position and the vertical position.

In the present embodiment, the torque sensor 105 and the position sensor 104 are connected with the motor 1033 in parallel. The torque sensor 105 senses the torsion angle and torsional force of the robotic arm during the patient's assisted motion, and the position sensor 104 senses positions and lengths of motions.

Thus, the rehabilitation robot of the present example may assist a patient with paralyzed upper or lower limbs to perform limb rehabilitation exercise by motion imagination based on virtual reality.

For example, in order to clarify how the above-described structure executes corresponding actions according to motion instructions, examples will be described below with reference to FIGS. 6 and 7.

Figure 6:
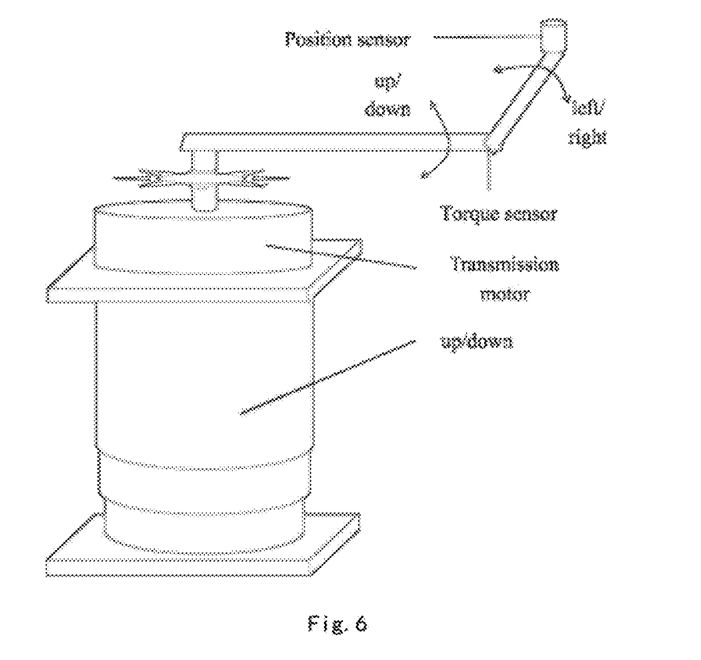
FIG. 6 is a structure diagram of yet another rehabilitation robot provided in an embodiment of the present disclosure.
Figure 7:
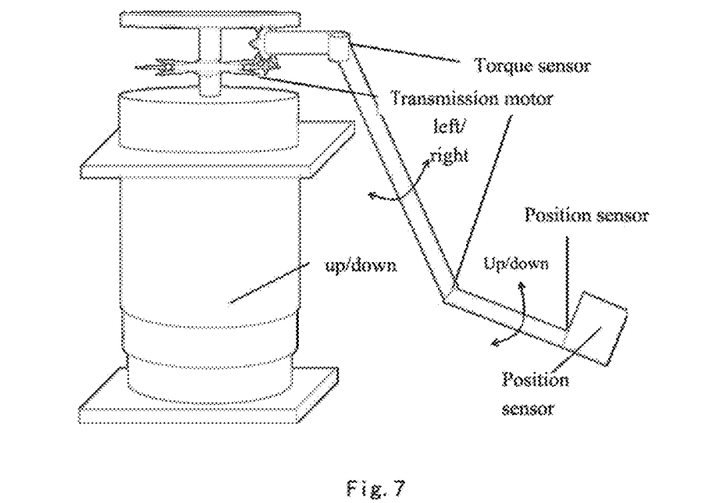
FIG. 7 is a structure diagram of yet another rehabilitation robot provided in an embodiment of the present disclosure.

For example, as shown in FIG. 6, up and down motion will be controlled which is mainly illustrated by the lifting platform shown in FIG. 6. For upper limb motions, an end handle is provided. The upper limb bearing and supporting structure is divided into two segments to accommodate motions of forearm, upper arm and elbow joint. The supporting assembly is capable of up and down and left and right motions respectively. There is a torque sensor for monitoring in twisted structure. There is a position sensor for monitoring at the handle end.

It is to be understood that besides the upper limb exercise shown in FIG. 6, lower limb exercise is also included. As shown in FIG. 7, up and down motion is controlled which is mainly illustrated by the lifting platform. For the lower limb exercise, an end pedal is provided. The lower limb bearing and supporting structure is divided into two segments to accommodate motions of leg, shank and knee joint. The supporting assembly is capable of up and down and left and right motions respectively. There is a torque sensor for monitoring in twisted structure. There is a position sensor for monitoring at the pedal end.

Figure 8:
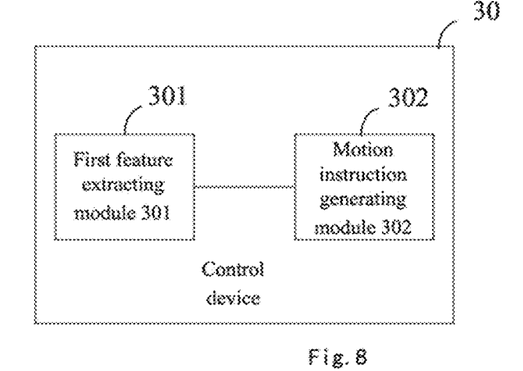
FIG. 8 is a structure diagram of a control device provided in an embodiment of the present disclosure.

Further, FIG. 8 is a structure diagram of a control device provided in an embodiment of the present disclosure. As shown in FIG. 8, the control device includes a first feature extracting module 301 and a motion instruction generating module 302.

The first feature extracting module 301 is configured to extract motion features in the brain wave signals.

The motion instruction generating module 302 is configured to generate motion instructions according to the motion features.

For example, it is possible to extract motion features such as up and down motion, left and right motion by processing brain wave signals with related algorithms and models to generate motion instructions such as instructions to move left or right according to the motion features.

Figure 9:
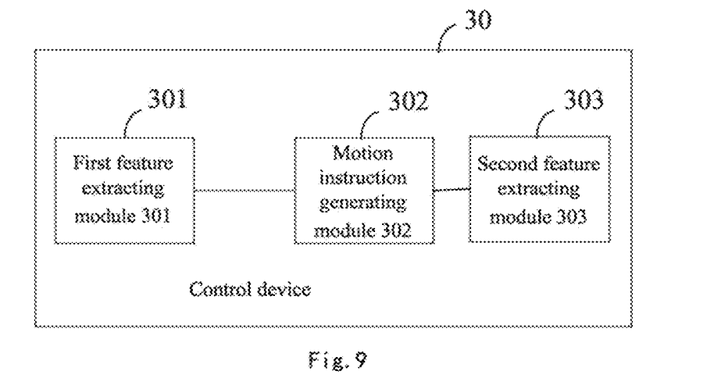
FIG. 9 is a structure diagram of another control device provided in an embodiment of the present disclosure.

Further, FIG. 9 is a structure diagram of a control device provided in an embodiment of the present disclosure. As shown in FIG. 9, the control device further includes a second feature extracting module 303.

The second feature extracting module 303 is configured to extract discomfort features in the brain wave signals, and the motion instruction generating module decreases the amplitude or frequency of actions according to the discomfort features. Thereby, it is possible to adjust amplitudes and frequencies of actions and even stop actions, avoiding secondary injury due to actions with too large amplitudes.

With the rehabilitation system according to embodiments of the present disclosure, the brain wave detector detects brain wave signals of the patient, and then the control device generates motion instructions according to the brain wave signals to control the rehabilitation robot to execute corresponding actions. Thereby, it is possible to control motion rehabilitation by sending brain waves according to the patient's motion imagination, thereby stimulating the patient's active motion intention, improving the rehabilitation effect and drastically saving the consumption of efforts and time.

Figure 10:
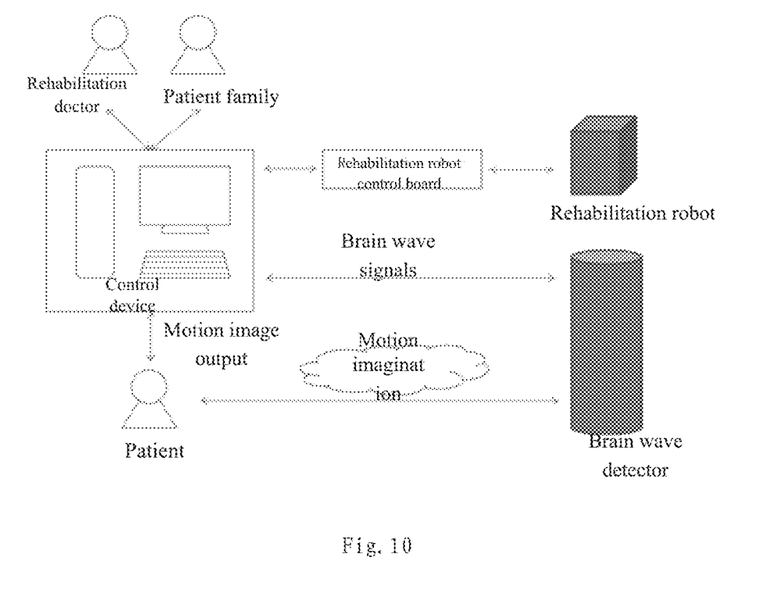
FIG. 10 is a structure diagram of yet another rehabilitation system provided in an embodiment of the present disclosure.

Based on the above-described embodiments, it is further possible to build an interaction system among the patient, the doctor, the family and the rehabilitation system. As specifically shown in FIG. 10, motion images are output in the control device to stimulate the patient to imagine motions, the brain wave detector detects the brain wave signals that are subjected to processing such as extraction and classification by pattern recognition and algorithm processing to generate motion instructions for controlling the rehabilitation robot to execute corresponding actions. Alternatively, the output motion images are subjected to processing such as identification and classification by mode identification and image processing to generate motion instructions that are sent to the rehabilitation robot to control it to execute corresponding actions. In this way, it is possible to guarantee that the motion images seen by the patient match the motions executed by the rehabilitation robot and help the patient to restore the motion consciousness.

Further, images are output to patient to form visual feedback based on the rehabilitation exercise of virtual reality, for which it is understandable that while images are output, motion instructions are output to control the rehabilitation robot to execute corresponding actions.

Thereby, motion imagination is implemented through image output, related brain wave signals are acquired and fed back to the control device for control over motion recovery, and the motion status is fed back at the same time.

For example, the patient implements motions according to prompts of the instructing device and the acquiring apparatus and the motion measuring meter acquire brain wave information and motion information. When brain wave information of limbs moving in different directions occurs, and in this process the patient is firstly prompted with time and direction. Efficiency of rehabilitation exercise is improved.

Figure 11:
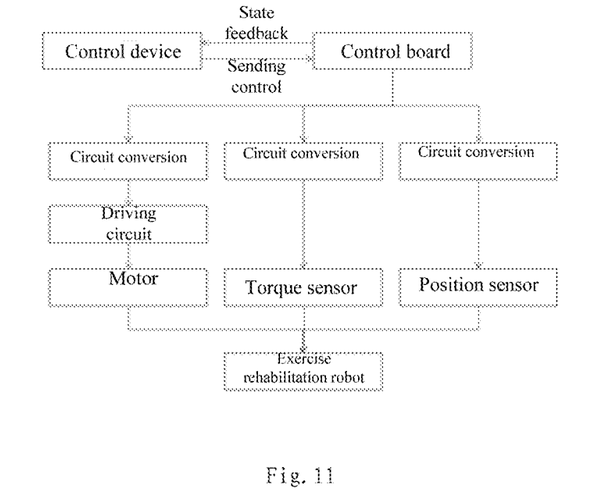
FIG. 11 is a structure diagram of controlling motion of rehabilitation robot provided in an embodiment of the present disclosure.

For example, the present embodiment avoids the problem that the rehabilitation exercise imposes high requirements on experience of the assisting doctor. As shown in FIG. 11, the doctor sends exercise parameters to the rehabilitation robot control board directly by inputting them to the control device and the control board feeds back motion information at the same time. The control board controls the motor via circuit conversion and motor driving circuit. In the rehabilitation robot, the torque sensor monitors torsion angles and the position sensor monitors horizontal and vertical positions. Brain wave signals are detected when the sensing resistance is too large and the patient feels discomfort to control the motion of the rehabilitation robot.

Thereby, in the rehabilitation recovery, if the patient can not operate the rehabilitation system for rehabilitation exercise autonomously when the patient suffers severe stroke or complete dyskinesia, with the rehabilitation system according to embodiments of the present disclosure, it is possible to implement rehabilitation exercise without doctor's assistance. That is, the doctor may set the exercise mode such that the patient imagines motion scenes and the rehabilitation system implements assisting motions, thereby realizing nerve and limb recovery. The one to one assisted exercise between doctor and patient is omitted.

Figure 12:
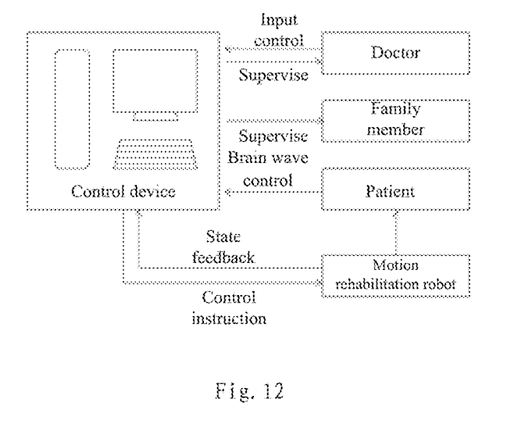
FIG. 12 is a structure diagram of another controlling motion of rehabilitation robot provided in an embodiment of the present disclosure.

In order to further improve the convenience of control, networking may be set by the control device such that remote surveillance may be implemented at the doctor and family's terminals. In the rehabilitation exercise, it is possible to implement passive exercise set by the doctor, or implement active exercise controlled by brain wave signals of the patient with the controlling relationship as shown in FIG. 12. Thereby, remote assistance by the patient's family may be realized to assist rehabilitation exercise by incorporating communication network.

It is appreciated that the patient family need not to master medical knowledge. What is more important in the dyscinesia recovery process is the duty of focusing and urging exercise. With the rehabilitation system according to embodiments of the present disclosure, it is possible that the patient family may learn the patient's exercise time, frequency and intensity via the platform interface with the networking device, and learn the rehabilitation state of the patient.

With the rehabilitation system according to embodiments of the present disclosure, when the patient's nerve is damaged, his brain emits brain wave signals through motion imagination, and the control device transfers motion instructions that match the brain wave signals or motion imagination scene to the rehabilitation robot. It is possible to assist the patient to issue motion instructions to realize the brain's control over limb motion and fix the motion nerve gradually.

Based on the above-described embodiments, the motion nerve is fixed gradually in the patient's rehabilitation exercise. Therefore, it is necessary to know in time the patient's status in stages of the rehabilitation exercise process and implement corresponding rehabilitation exercise mode. An example is as follows.

As a scenario implementation, in the case that the patient's nervous system can not control motions of limbs completely, the doctor sets the exercise time, intensity and frequency for the patient via the system, the patient implement indirect control over limb motions via motion imagination and the rehabilitation system, and the family supervise exercises and learn the patient's rehabilitation state.

As another scenario implementation, in the case that the patient's nervous system is gradually restoring control over limbs but the muscle system can not control with high intensity, the doctor decreases the exercise time, intensity and frequency for the patient via the rehabilitation system, the patient still implements indirect control over limb motions via motion imagination and the rehabilitation system, the rehabilitation system adjusts autonomously according to the automatic learning and exercise feedback, and the family supervise exercises and learn the patient's rehabilitation state.

As yet another scenario implementation, in the case that the patient approaches recovery, the patient sets the exercise intensity, frequency and time autonomously, the doctor supervises exercises and determines the patient's rehabilitation state by professional knowledge and proposes rehabilitation exercise advices for the patient, and the patient's family learn the patient's rehabilitation state in real time via the system.

With the rehabilitation system according to embodiments of the present disclosure, the brain wave detector detects brain wave signals of the patient, and then the control device generates motion instructions according to the brain wave signals to control the rehabilitation robot to execute corresponding actions. Thereby, it is possible to control motion rehabilitation by sending brain waves according to the patient's motion imagination, thereby stimulating the patient's active motion intention, improving the rehabilitation effect and drastically saving the consumption of efforts and time.

In order to realize the above-described embodiments, the present disclosure further proposes a rehabilitation method. The method corresponds to the aforementioned rehabilitation system. For the brevity of description, it will be described briefly below and aforementioned embodiments may be referred to for details.

Figure 13:
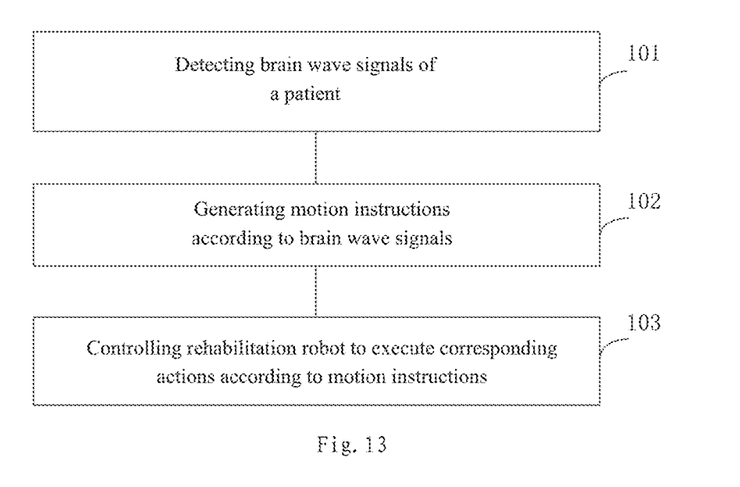
FIG. 13 is a flow diagram of a rehabilitation method provided in an embodiment of the present disclosure.

FIG. 13 is a flow diagram of a rehabilitation method provided in an embodiment of the present disclosure. As shown in FIG. 13, the rehabilitation method includes the following steps.

In step 101, brain wave signals of the patient are detected.

In step 102, motion instructions are generated according to the brain wave signals.

In step 103, the rehabilitation robot is controlled to execute corresponding actions according to motion instructions.

Further, there are many ways in which the rehabilitation robot is controlled to execute corresponding actions according to motion instructions. As an example, the motion features are extracted from the brain wave signals and motion instructions are generated according to the motion features.

Further, in one possible implementation of the embodiments of the present disclosure, there are many ways in which corresponding motion images are played to the patient. As an example, motion images are played in virtual reality to output images to the patient to form visual feedback, which further improves interaction effects between the patient and the rehabilitation robot and thereby improving rehabilitation effects.

Further, in one possible implementation of embodiments of the present disclosure, it is also possible to extract discomfort features in the brain wave signals by processing brain wave signals and then decrease the amplitude or frequency of actions according to the discomfort features.

For example, the above explanation for embodiments of the rehabilitation system will also be applicable to the rehabilitation method of the present embodiment and will not be described any more herein.

With the rehabilitation method according to embodiments of the present disclosure, the brain wave detector detects brain wave signals of the patient, and then the control device generates motion instructions according to the brain wave signals to control the rehabilitation robot to execute corresponding actions. Thereby, it is possible to control motion rehabilitation by sending brain waves according to the patient's motion imagination, thereby stimulating the patient's active motion intention, improving the rehabilitation effect and drastically saving the consumption of efforts and time.

Figure 14:
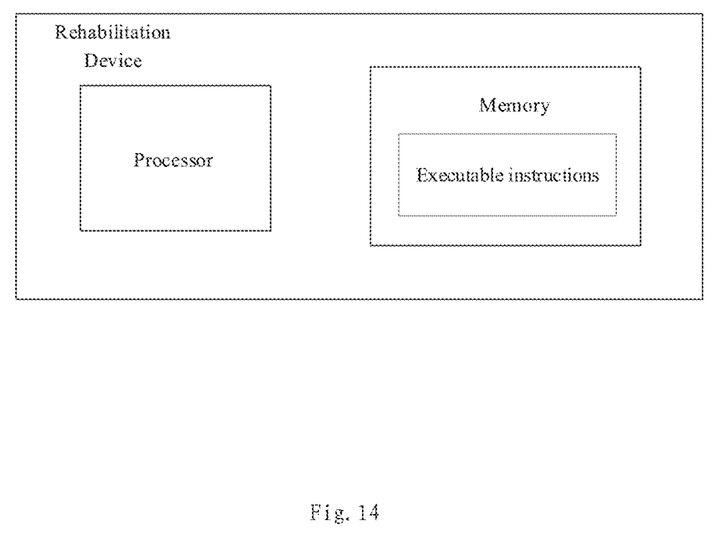
FIG. 14 is a structure diagram of a rehabilitation device provided in an embodiment of the present disclosure.

In order to realize the above-described embodiments, the present disclosure further proposes a rehabilitation device including a processor and a memory for storing instructions executable by the processor, for example, as illustrated in FIG. 14.

The processor is configured to detect brain wave signals of the patient, generate motion instructions according to the brain wave signals and control the rehabilitation robot to execute corresponding actions according to motion instructions.

In order to implement the above-described embodiments, the present disclosure further provides a non-transient computer readable storage medium which, when instructions in said storage medium are executed by the processor, causes a rehabilitation method to be executed, which includes: detecting brain wave signals of the patient, generating motion instructions according to the brain wave signals and controlling the rehabilitation robot to execute corresponding actions according to motion instructions.

In order to implement the above-described embodiments, the present disclosure further provides a computer program product which, when instructions in said computer program product are executed by the processor, causes a rehabilitation method to be executed, which includes: detecting brain wave signals of the patient, generating motion instructions according to the brain wave signals and controlling the rehabilitation robot to execute corresponding actions according to motion instructions.

In the description of the present disclosure, the reference terms "one embodiment", "some embodiments", "example", "specific example" or "some examples" are intended to mean that specific features, structures, materials or characteristics described with reference to the embodiments or examples are included in at least one embodiment or example of the present disclosure. In the present description, illustrative description of the above-mentioned terms is not necessarily for the same embodiments or examples. Further, the described specific features, structures, materials or characteristics may be combined in any suitable way in any one or more embodiments or examples. In addition, those skilled in the art may combine different embodiments or examples and features of different embodiments or examples described in the present specification without contradictions.

Furthermore, terms such as "first", "second" etc. are only used for description rather than being interpreted as indicating or implying relative importance or implicitly indicating the number of the referenced technical features. Thereby, features defined by "first", "second" etc. may explicitly or implicitly include at least one of the features. In the description of the present disclosure, "a plurality of" means at least two, for example, two, three etc., unless otherwise defined specifically.

Any process or method described in flow charts or in other ways herein may be understood as indicating a module, a section or a part of codes of executable instructions including one or more steps for implementing custom logic functions or processes, and the scope of preferred implementations of the present disclosure includes additional implementations in which functions may be executed in order other than those illustrated or discussed, including substantially simultaneous or reverse order, which should be understood by those skilled in the art to which embodiments of the present disclosure belong.

Logics and/or steps indicated in flowcharts or otherwise described herein may, for example, be considered as a sequential list of executable instructions for implementing logic functions, and may be embodied in any computer readable media for use by an instruction effecting system, device or apparatus (such as a system based on computers, a system including processors or other systems that can fetch and execute instructions from instruction executing system, device or apparatus) or use with these instruction executing system, device or apparatus. For the present specification, the "computer readable medium" may be any devices that contain, store, communicate, distribute or transmit programs to be used by or with instruction effecting systems, devices or apparatuses. More specific examples of computer readable media (inexhaustive list) include an electric connection section with one or more wirings (electronic device), a portable computer disk (magnetic device), a random access memory (RAM), a read only memory (ROM), an erasable programable read only memory (EPROM or flash memory), an optic fiber device and a portable compact disk read only memory (CDROM). In addition, the computer readable medium may even be paper or other suitable medium on which said programs may be printed, since said programs may be obtained electronically by for example optically scanning the paper or other media followed by editing, interpreting or otherwise processing when necessary and stored in the computer storage.

It should be understood that various parts of the present disclosure may be implemented in hardware, software, firmware or combination thereof. In the above-described implementations, multiple steps or methods may be implemented in software or firmware that is stored in the storage and executed by appropriate instruction effecting system. For example, if implemented in hardware, as in another implementation, they may be implemented with any one or combination thereof of the following technologies known in related art: discrete logic circuits with logic gate circuits for implementing logic functions on data signals, application specific integrated circuits with suitable combined logic gate circuits, programmable gate arrays (PGA) and field programmable gate arrays (FPGA).

Those of ordinary skill in the art may appreciate that implementing all or partial steps contained in the method according to above-described embodiments may be accomplished by programs instructing related hardware. Said programs may be stored in a computer readable storage medium and, while being executed, includes one or combination of steps of the method embodiment.

Moreover, functional units in embodiments of the present disclosure may be integrated in one processing module, or physically exist separately, or two or more of them may be integrated in one module. The above-mentioned integrated module may be implemented in form of hardware or in form of software functional modules. When said integrated module is implemented in form of software functional modules and sold or used as separate products, it may be stored in one computer readable storage medium.

The above-mentioned storage medium may be read only memory, magnetic disk or compact disk. While embodiments of the present disclosure have been illustrated and described above, it is appreciated that the above-described embodiments are illustrative and can not be interpreted as limiting the present disclosure. Those of ordinary skill in the art may make variations, modifications, substitutions and changes to the above-described embodiments within the scope of the present disclosure.

The present application claims priority of Chinese Patent Application No. 201710322996.1 filed on May 9, 2017, the content of which is incorporated herein in its entirety by reference as a part of the present application.

What is claimed is:

1. A rehabilitation system, comprising:
    a rehabilitation robot, wherein the rehabilitation robot comprises:
        a base,
        a supporter, and
        a driving assembly for controlling motion of the supporter, wherein the driving assembly comprises:
            a first cantilever connected with the base,
            a second cantilever connected with the first cantilever, and
            a motor for driving the first cantilever and the second cantilever, wherein the driving assembly is configured to execute corresponding actions according to motion instructions received by the rehabilitation robot, and decrease amplitude of the corresponding physical actions of the driving assembly according to discomfort features in brain wave signals received by the rehabilitation robot;
    a brain wave detector configured to detect the brain wave signals of a user;
    a control device configured to generate the motion instructions according to the brain wave signals to control the rehabilitation robot to execute corresponding actions; and
    a motion image player configured to display motion images corresponding to the corresponding actions to the user;
    wherein the control device further is configured to receive the motion instructions obtained by identifying the motion images when the brain wave detector fails to detect the brain wave signals, to control the rehabilitation robot to execute corresponding actions.

2. The rehabilitation system according to claim 1, wherein the rehabilitation robot further comprises:
    a position sensor, located over the supporter and configured to detect a horizontal position of the supporter; and
    a torque sensor, located between the first cantilever and the second cantilever and configured to detect a vertical position of the supporter.

3. The rehabilitation system according to claim 1, wherein the control device is configured to control the driving assembly of the rehabilitation robot according to the horizontal position and the vertical position.

4. The rehabilitation system according to claim 3, wherein the control device comprises:
    a first feature extracting module configured to extract motion features in the brain wave signals; and
    a motion instruction generating module configured to generate the motion instructions according to the motion features.

5. The rehabilitation system according to claim 4, wherein the control device further comprises:
    a second feature extracting module configured to extract the discomfort features in the brain wave signals, wherein the motion instruction generating module decreases amplitude or frequency of the corresponding actions according to the discomfort features.

6. The rehabilitation system according to claim 1, wherein the control device comprises:
    a first feature extracting module configured to extract motion features in the brain wave signals; and
    a motion instruction generating module configured to generate the motion instructions according to the motion features.

7. The rehabilitation system according to claim 6, wherein the control device further comprises:
    a second feature extracting module configured to extract discomfort features in the brain wave signals.

8. The rehabilitation system according to claim 1, wherein the motion image player is configured to display the motion images in a virtual reality mode.

9. A rehabilitation method, comprising:
    detecting brain wave signals of a user;
    generating motion instructions according to the brain wave signals; and
    controlling a rehabilitation robot to execute corresponding actions according to the motion instructions,
    wherein generating motion instructions according to the brain wave signals and controlling the rehabilitation robot to execute corresponding actions according to the motion instructions comprise:
        extracting discomfort features in the brain wave signals,
        generating the motion instructions according to the discomfort features; and
        decreasing amplitude of the corresponding physical actions according to the discomfort features, and
    the method further comprising:
        displaying motion images corresponding to the corresponding actions to the user; and
        receiving the motion instructions obtained by identifying the motion images when failing to detect the brain wave signals.

10. A rehabilitation device comprising: a processor; and a memory storing executable instructions;
    wherein the processor is configured to perform the method according to claim 9 while executing the instructions.

11. A nonvolatile computer readable storage medium storing computer program instructions, which is executed by a processor, to perform the method according to claim 9.

12. The rehabilitation method according to claim 9, further comprising:
    displaying the motion images in a virtual reality mode.

* * * * *